United States Patent
Davis

(10) Patent No.: US 11,123,916 B2
(45) Date of Patent: Sep. 21, 2021

(54) FORMING A THRUST REVERSER CASCADE USING CORRUGATED BODIES

(71) Applicant: Rohr, Inc., Chula Vista, CA (US)

(72) Inventor: Jennifer Davis, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 50 days.

(21) Appl. No.: 16/404,363

(22) Filed: May 6, 2019

(65) Prior Publication Data

US 2020/0353667 A1    Nov. 12, 2020

(51) Int. Cl.
| | |
|---|---|
| *B29C 53/24* | (2006.01) |
| *F02K 1/54* | (2006.01) |
| *B29C 65/00* | (2006.01) |
| *B29K 701/12* | (2006.01) |
| *B29L 31/30* | (2006.01) |

(52) U.S. Cl.
CPC .............. *B29C 53/24* (2013.01); *B29C 66/43* (2013.01); *B29C 66/721* (2013.01); *F02K 1/54* (2013.01); *B29K 2701/12* (2013.01); *B29L 2031/3076* (2013.01)

(58) Field of Classification Search
CPC ....... B29C 53/24; B29C 66/43; B29C 66/721; F02K 1/54; B29L 2031/3076; B29K 2701/12
USPC .......................................................... 156/242
See application file for complete search history.

(56) References Cited

U.S. PATENT DOCUMENTS

| | | | |
|---|---|---|---|
| 4,067,094 A | 1/1978 | Ittner | |
| 4,596,621 A | 6/1986 | Nawaz | |
| 4,722,821 A | 2/1988 | Vermilye | |
| 4,852,805 A | 8/1989 | Vermilye | |
| 4,893,743 A * | 1/1990 | Eylon | B21D 47/00 228/181 |
| 5,342,679 A | 8/1994 | Aochi et al. | |
| 5,576,079 A | 11/1996 | Forman et al. | |
| 6,557,338 B2 | 5/2003 | Holme et al. | |
| 6,725,541 B1 | 4/2004 | Holme et al. | |
| 8,221,087 B2 | 7/2012 | Schreiber | |
| 8,484,944 B2 | 7/2013 | Urban et al. | |
| 9,045,992 B2 | 6/2015 | Roussille et al. | |
| 9,527,238 B2 | 12/2016 | Kruckenberg | |
| 9,895,840 B2 | 2/2018 | Bartel et al. | |
| 2002/0098321 A1 * | 7/2002 | Lewis | B32B 3/12 428/118 |
| 2007/0210472 A1 | 9/2007 | Dlnca et al. | |

(Continued)

FOREIGN PATENT DOCUMENTS

| | | | |
|---|---|---|---|
| CN | 103328194 A | 9/2013 | |
| FR | 3048025 A1 * | 8/2017 | ............. B29C 70/46 |

(Continued)

OTHER PUBLICATIONS

EP search report for EP19212394.1 dated Jul. 3, 2020.

*Primary Examiner* — Matthew J Daniels
*Assistant Examiner* — Andrew L Swanson
(74) *Attorney, Agent, or Firm* — Getz Balich LLC

(57) ABSTRACT

A manufacturing process is provided during which a thrust reverser cascade is formed for an aircraft propulsion system. During the formation of the thrust reverser cascade, a first panel of material is stamped into a first corrugated body. A second panel of material is stamped into a second corrugated body. The first corrugated body is bonded to the second corrugated body.

14 Claims, 12 Drawing Sheets

(56) References Cited

U.S. PATENT DOCUMENTS

| | | |
|---|---|---|
| 2008/0182017 A1 | 7/2008 | Singh et al. |
| 2012/0189798 A1 | 7/2012 | Goering et al. |
| 2014/0099476 A1 | 4/2014 | Subramanian et al. |
| 2014/0120296 A1 | 5/2014 | Goering et al. |
| 2014/0220295 A1 | 8/2014 | Goering et al. |
| 2014/0328693 A1 | 11/2014 | Wilson et al. |
| 2014/0361460 A1 | 12/2014 | Mark |
| 2015/0165691 A1 | 6/2015 | Mark et al. |
| 2015/0226157 A1 | 8/2015 | Calder et al. |
| 2016/0263820 A1* | 9/2016 | Kruckenberg .......... B29C 70/06 |
| 2018/0340492 A1 | 11/2018 | Harpal et al. |
| 2019/0055900 A1 | 2/2019 | Wadsworth et al. |
| 2019/0113001 A1 | 4/2019 | Wadsworth |

FOREIGN PATENT DOCUMENTS

| | | |
|---|---|---|
| FR | 3048025 B1 | 5/2019 |
| WO | 2015006485 A1 | 1/2015 |

\* cited by examiner

FORMING A THRUST REVERSER CASCADE USING CORRUGATED BODIES

BACKGROUND

1. Technical Field

This disclosure relates generally to a thrust reverser for an aircraft propulsion system and, more particularly, to methods for forming a cascade for the thrust reverser.

2. Background Information

An aircraft propulsion system may include a thrust reverser for redirecting bypass air in a forward direction to generate reverse thrust. Several types of thrust reversers are known in the art. Many of these thrust reversers include one or more arrays of cascades. Each cascade typically includes a series of aerodynamic vanes for redirecting bypass air in a desired forward direction during reverse thrust operation.

A composite cascade may be manufactured using a closed-die or autoclave molding process. For example, carbon fiber fabric is laid-up in a mold around mandrels that define open passageways of the cascade. The layup process is generally done by hand and is labor intensive. After this layup, the mold is closed and compressed to consolidate the fabric layers. The process may be expensive, difficult and time consuming.

There is a need in the art for improved processes for manufacturing a thrust reverser cascade, particularly those made from fiber-reinforced composite material.

SUMMARY OF THE DISCLOSURE

According to an aspect of the present disclosure, a manufacturing process is provided during which a thrust reverser cascade is formed for an aircraft propulsion system. During the formation of the thrust reverser cascade, a first panel of material is stamped into a first corrugated body. A second panel of material is stamped into a second corrugated body. The first corrugated body is bonded to the second corrugated body.

According to another aspect of the present disclosure, another manufacturing process is provided during which a thrust reverser cascade is formed for an aircraft propulsion system. During the formation of the thrust reverser cascade, a first panel of material is formed into a first corrugated body with a plurality of first peaks. A second panel of material is formed into a second corrugated body with a plurality of second peaks. Each of the plurality of first peaks is bonded to a respective one of the plurality of second peaks.

According to still another aspect of the present disclosure, another manufacturing process is provided during which a thrust reverser cascade is formed for an aircraft propulsion system. During the formation of the thrust reverser cascade, a plurality of panels are stamped respectively into a plurality of corrugated bodies. The plurality of corrugated bodies are arranged side-by-side in an array. The arranged plurality of corrugated bodies are respectively bonded together.

The thrust reverser cascade may be configured from or otherwise include fiber reinforcement within a polymer matrix.

The first panel of material may be configured from or otherwise include polymer material.

The first panel of material may be a fiber-reinforced thermoplastic panel of material.

The bonding of the first corrugated body to the second corrugated body may include bonding a first peak of the first corrugated body to a second peak of the second corrugated body.

The first peak may be configured with a first chamfered edge.

The second peak may be configured with a second chamfered edge. The second chamfered edge may be bonded to the first chamfered edge.

The first corrugated body may include a radiused interior corner positioned opposite the first peak.

The thrust reverser cascade may include a first rail, a second rail and a plurality of vanes connected to and extending between the first rail and the second rail. The first corrugated body may be configured as or otherwise include a first corrugation. A first section of the first corrugation may form a first of the plurality of vanes. A second section of the first corrugation may form a first portion of the first rail.

The first corrugated body may also include a second corrugation. A section of the second corrugation may form a first portion of the second rail.

The second corrugated body may be configured as or otherwise include a second corrugation. A first section of the second corrugation may form a second of the plurality of vanes that is spaced from the first of the plurality of vanes by an air channel. A second section of the second corrugation may form a second portion of the first rail that is adjacent and connected to the first portion of the first rail.

The forming of the thrust reverser cascade may also include bonding a third panel of material to the first corrugated body and the second corrugated body. The third panel of material may at least partially form an exterior sidewall of the thrust reverser cascade.

The first panel of material may be configured with a continuous length of fiber reinforcement that extends end-to-end through the first panel of material.

The thrust reverser cascade may include a first rail, a second rail and a plurality of vanes connected to and extending between the first rail and the second rail. Each of the bonded and arranged plurality of corrugated bodies may form a respective portion of the first rail, a respective portion of the second rail and a respective one of the plurality of vanes.

The forming of the thrust reverser cascade may also include bonding a flat panel of material to each of the plurality of corrugated bodies. The flat panel of material may at least partially form an exterior sidewall of the thrust reverser cascade.

A first of the plurality of panel may be configured with a continuous length of fiber that extends at least substantially along an entire length of the first of the plurality of panels.

Each of the plurality of panels may be a fiber-reinforced thermoplastic panel of material.

The respective bonding of the arranged plurality of corrugated bodies may include bonding a first peak of a first of the plurality of corrugated bodies to a second peak of a second of the plurality of corrugated bodies.

The foregoing features and the operation of the invention will become more apparent in light of the following description and the accompanying drawings.

DETAILED DESCRIPTION

Figure 1:
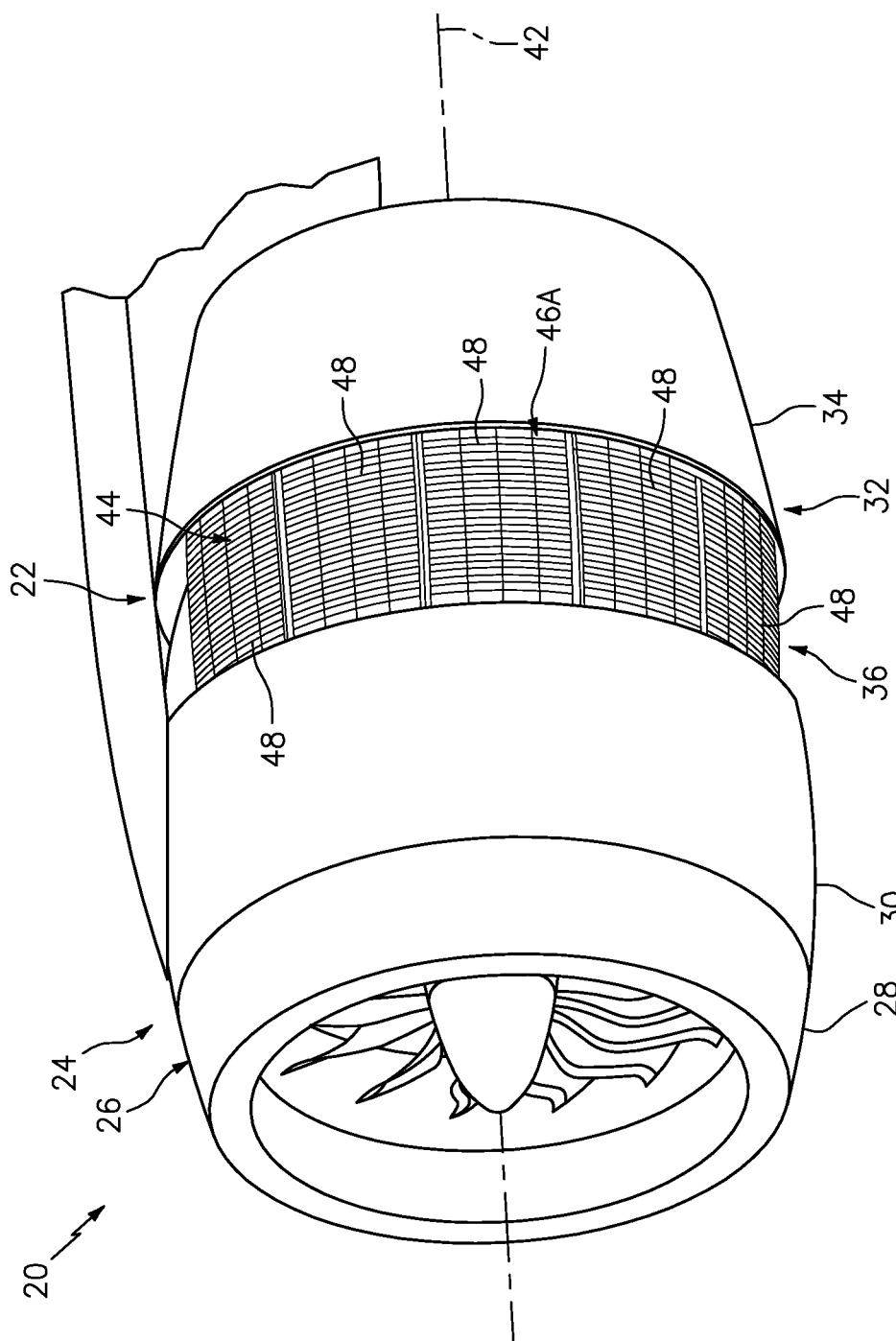
FIG. 1 is a perspective illustration of an aircraft propulsion system with its thrust reverser in a deployed configuration.

The present disclosure includes methods for manufacturing one or more cascades for a thrust reverser of an aircraft propulsion system. This aircraft propulsion system includes and is powered by a gas turbine engine such as, but not limited to, a turbofan gas turbine engine or a turbojet gas turbine engine. An exemplary embodiment of such an aircraft propulsion system 20 and such a thrust reverser 22 is illustrated in FIG. 1. For ease of description, the methods of the present disclosure may be described below with reference to the exemplary aircraft propulsion system 20 and thrust reverser 22 of FIG. 1. The methods of the present disclosure, however, may also be performed to manufacture thrust reverser cascades for different aircraft propulsion systems and cascades of different types and configurations other than those described below and illustrated in the drawings.

Figure 2:
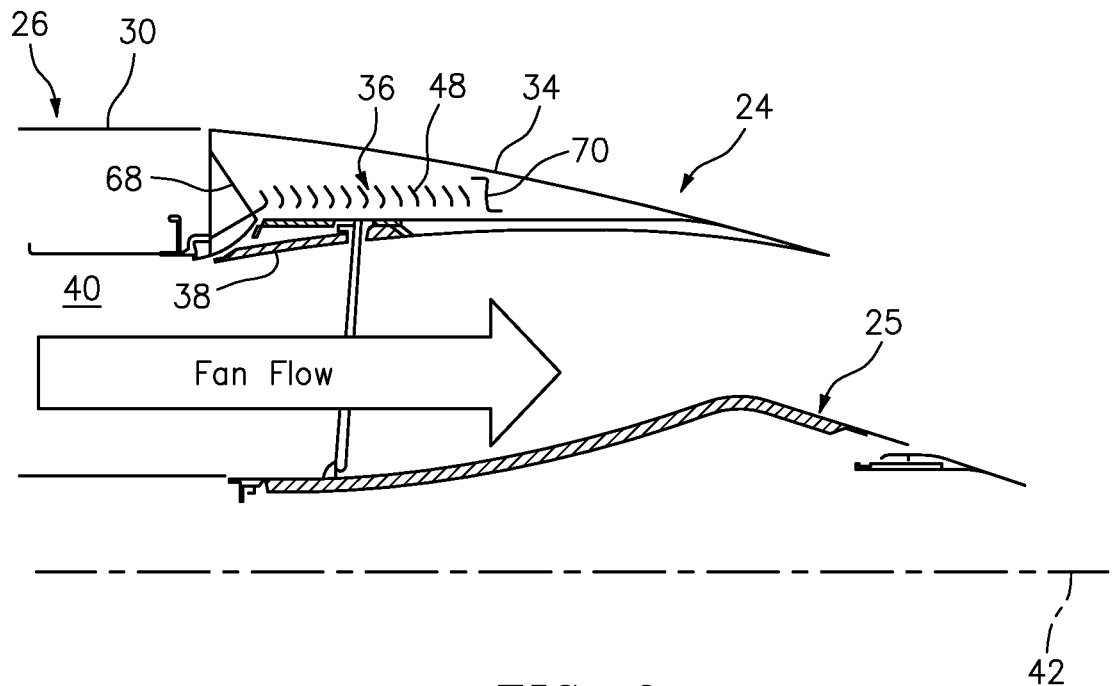
FIG. 2 is a side sectional illustration of an aft portion of the aircraft propulsion system with its thrust reverser in a stowed configuration.
Figure 3:
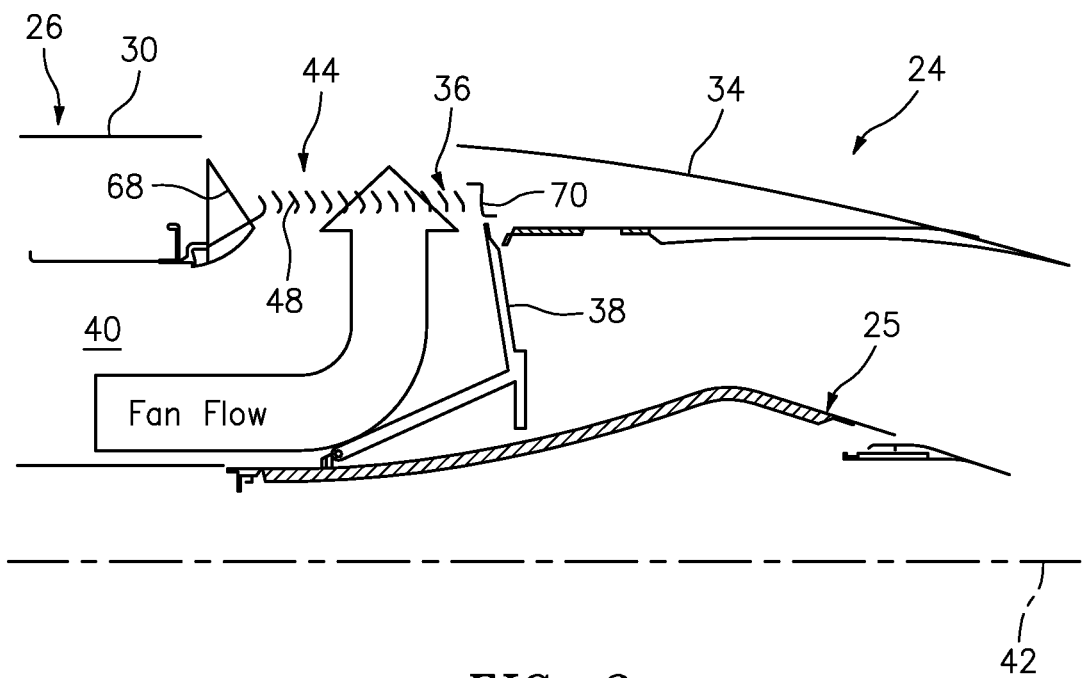
FIG. 3 is a side sectional illustration of the aft portion of the aircraft propulsion system with its thrust reverser in the deployed configuration.

The propulsion system 20 of FIG. 1 includes an outer (e.g., fan/bypass) nacelle structure 24 and an inner (e.g., core) nacelle structure 25 (see FIGS. 2 and 3). This inner nacelle structure 25 may be referred to as an "inner fixed structure" or an "IFS". Referring to FIGS. 2 and 3, the inner nacelle structure 25 houses and is configured to provide an aerodynamic cover for a core of the gas turbine engine. Briefly, the engine core may include a compressor section, a combustion section and a turbine section of the gas turbine engine.

Referring again to FIG. 1, the outer nacelle structure 24 includes a stationary forward module 26, which may include a nacelle inlet 28 and a fan cowling 30. The outer nacelle structure 24 also includes an aft thrust reverser module 32. This thrust reverser module 32 includes a translating sleeve 34 and a thrust reverser cascade array 36. Referring to FIGS. 2 and 3, the thrust reverser module 32 may also include one or more blocker doors 38 configured to deploy and direct air from a bypass flowpath 40 of the aircraft propulsion system 20 into the cascade array 36 during thrust reverser 22 deployment.

Figure 4:
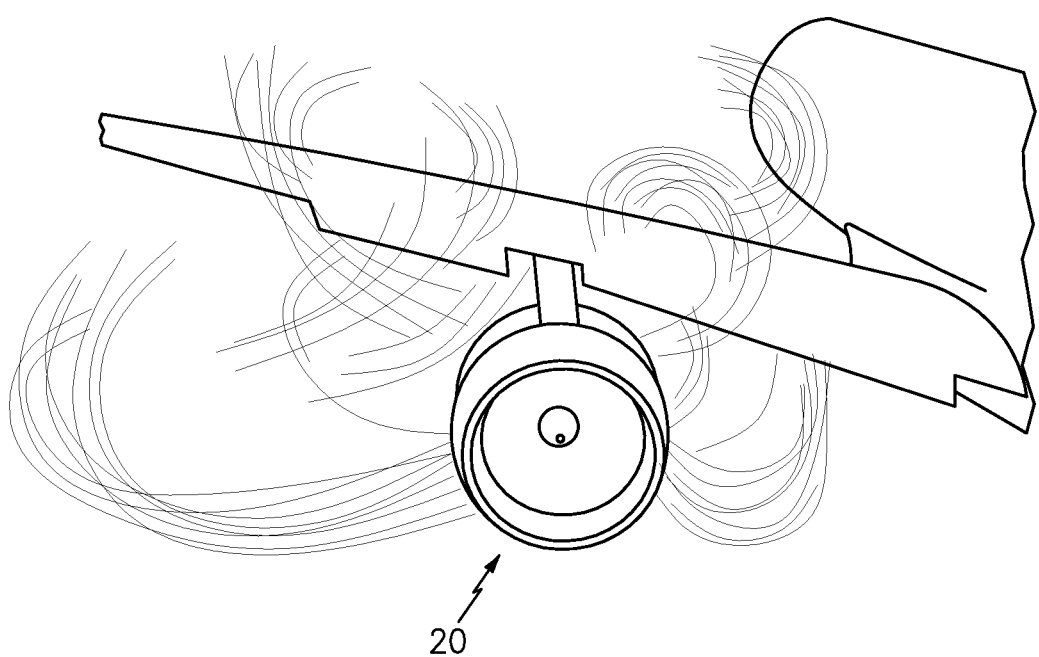
FIG. 4 is another perspective illustration of the aircraft propulsion system with its thrust reverser in the deployed configuration as well as exemplary flowpaths of air directed out of the thrust reverser.

The translating sleeve 34 is configured to translate axially aft along an axial centerline 42 of the propulsion system 20 in order to expose the cascade array 36 and open a thrust reverser flowpath 44 (see FIG. 3). This thrust reverser flowpath 44 receives bypass air from the bypass flowpath 40, and directs this air through the cascade array 36 which redirects that air in a radially outward and axially forward direction. The cascade array 36 may also redirect the air in a circumferential direction in order to, for example, direct the air away from a runway and/or wings of an aircraft as illustrated in FIG. 4. The translating sleeve 34 is also configured to translate axially forward along the centerline 42 in order to cover the cascade array 36 and close the thrust reverser flowpath 44 (see FIG. 2).

Referring again to FIG. 1, the cascade array 36 may include one or more sub-arrays 46. The cascade array 36 of FIG. 1, for example, include first and second sub-arrays 46, where the second sub-array 46B is substantially diametrically opposed from the first sub-array 46A and therefore hidden in FIG. 1. Each of these sub-arrays 46 includes one or more thrust reverser cascades 48 arranged circumferentially around the centerline 42.

Figure 5:
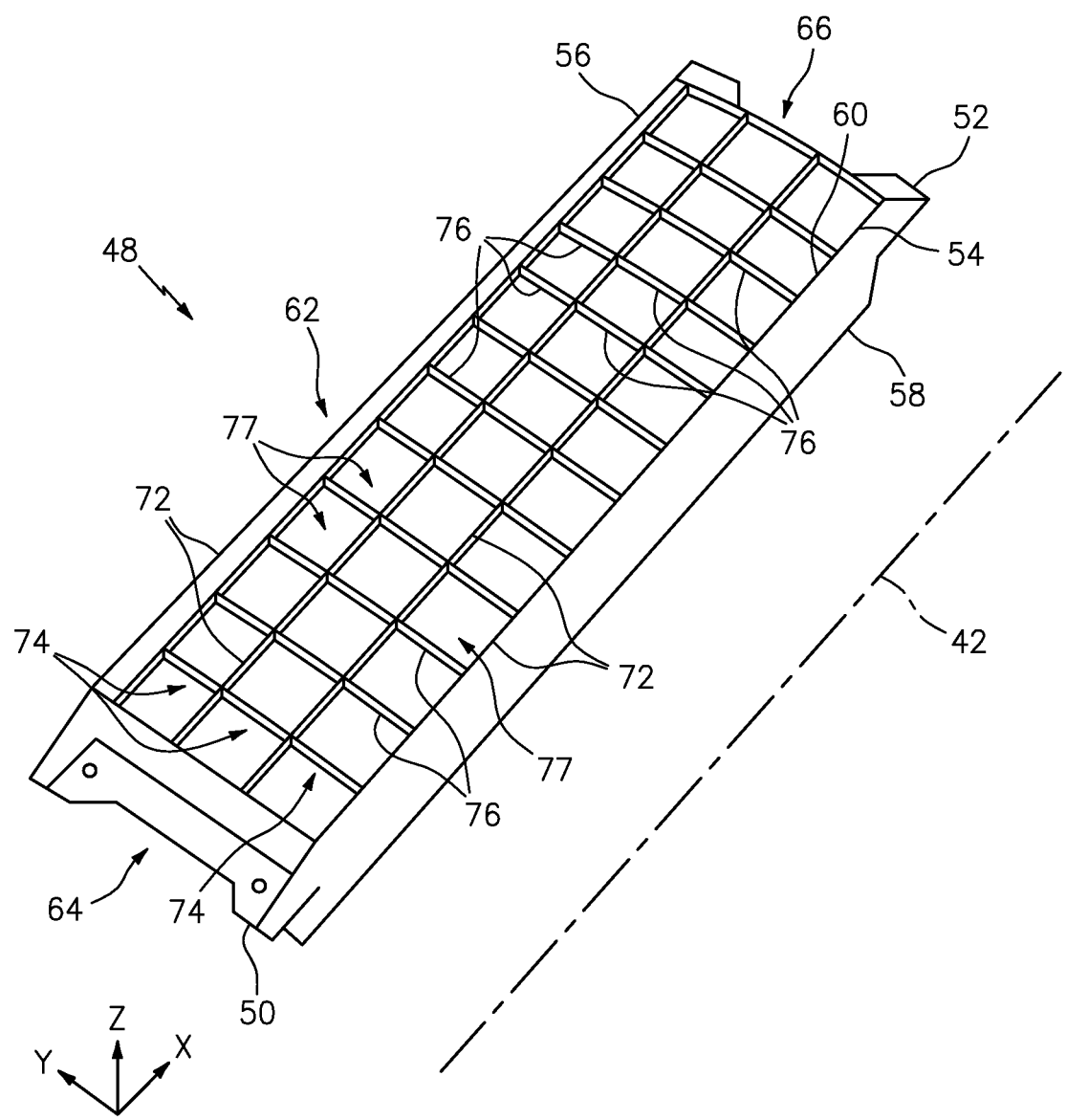
FIG. 5 is a perspective illustration of an embodiment thrust reverser cascade for the thrust reverser.

FIG. 5 illustrates an exemplary one of the thrust reverser cascades 48. This cascade 48 extends longitudinally (e.g., along an x-axis and generally parallel with the centerline 42) between opposing cascade ends 50 and 52. The cascade 48 extends laterally (e.g., along a y-axis and generally circumferentially around or tangent to the centerline 42) between opposing cascade sides 54 and 56. The cascade 48 also extends transversely (e.g., along a z-axis and generally radially relative to the centerline 42) between opposing inner and outer sides 58 and 60.

The cascade 48 of FIG. 5 includes a base cascade structure 62 and one or more attachments 64 and 66; e.g., mounting structures. Each of these attachments 64 and 66 is configured to attach/mount the cascade structure 62 to another structure of the propulsion system 20 such as, but not limited to, a torque box 68 or an aft cascade ring 70 (see FIGS. 2 and 3). The attachments 64 and 66 of FIG. 5, for example, are configured as attachment flanges with apertures for receiving fasteners; e.g., bolds, rivets, etc.

Figure 6:
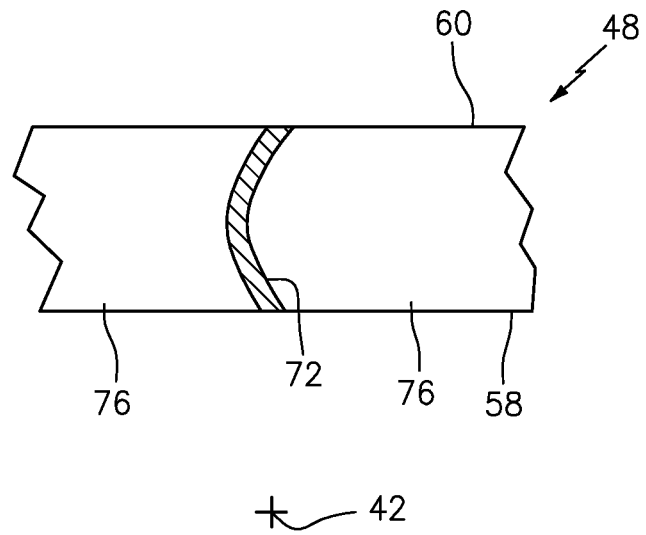
FIG. 6 is a cross-sectional illustration of a portion of an embodiment of the thrust reverser cascade.
Figure 7:
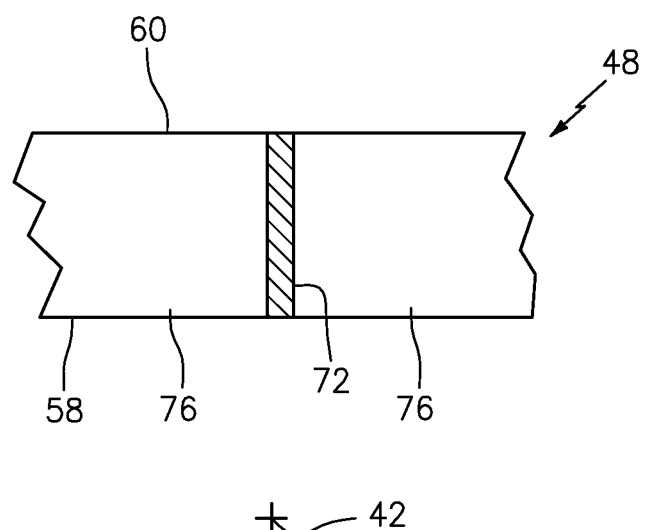
FIG. 7 is a cross-sectional illustration of a portion of another embodiment of the thrust reverser cascade.

The cascade structure 62 includes a plurality of strongback rails 72 and one or more arrays 74 of cascade vanes 76. The strongback rails 72 of FIG. 5 are arranged parallel with one another, and extend longitudinally between the cascade ends 50 and 52. One or more of the strongback rails 72 (e.g., the laterally exterior rails) may extend into and/or may be configured with one or more of the attachments 64 and 66. One or more of the strongback rails 72 (e.g., the laterally interior rails) may extend to one or more of the attachments 64 and 66. Referring to FIG. 6, each of the strongback rails 72 may have a non-linear (e.g., curved) cross-sectional geometry in order to redirect air flowing through the cascade 48 in the circumferential direction. Alternatively, referring to FIG. 7, one or more of the strongback rails 72 may each have a linear (e.g., straight) cross-sectional geometry.

Figure 8:
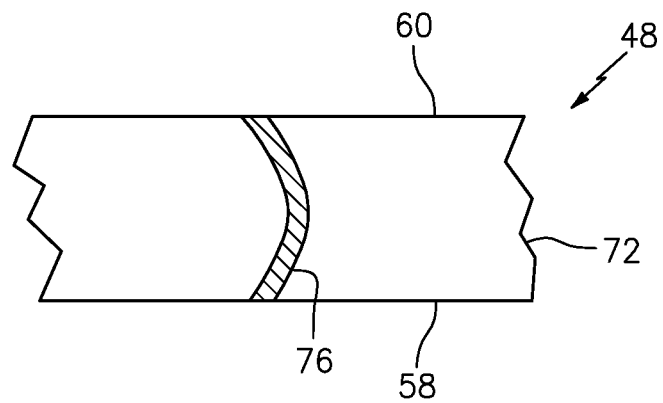
FIG. 8 is a side sectional illustration of a portion of an embodiment of the thrust reverser cascade.
Figure 9:
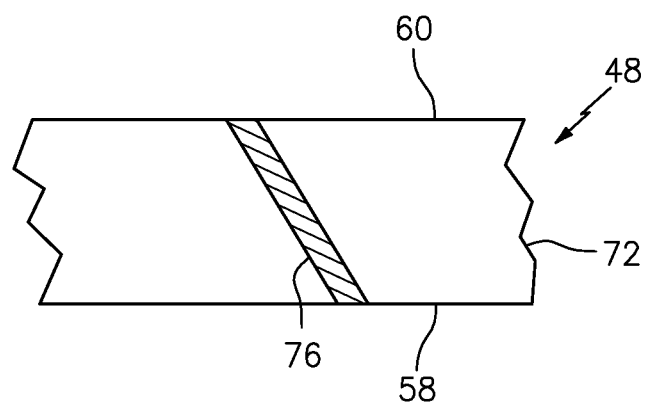
FIG. 9 is a side sectional illustration of a portion of another embodiment of the thrust reverser cascade.

Referring again to FIG. 5, the arrays 74 of cascade vanes 76 are respectively arranged between laterally adjacent strongback rails 72. Each of the arrays 74 of cascade vanes 76 includes a plurality of the cascade vanes 76, which are disposed at discrete locations along the longitudinally length of the strongback rails 72. Each longitudinally adjacent pair of vanes 76 thereby forms an air channel 77 therebetween. Each of the cascade vanes 76 extends laterally between and is connected to (e.g., bonded to or formed integral with) a respective adjacent set of the strongback rails 72. Referring to FIG. 8, each of the cascade vanes 76 may have a non-linear (e.g., curved) cross-sectional geometry in order to redirect air flowing through the cascade 48 in the axial direction. Alternatively, referring to FIG. 9, one or more of the cascade vanes 76 may each have a linear (e.g., straight) cross-sectional geometry.

As described below in further detail, the entire cascade 48 or at least a portion thereof may be composed of composite material; e.g., fiber-reinforced composite material. For example, the cascade 48 may be formed using fiber reinforcement within a polymer matrix; e.g., thermoplastic material. Examples of the fiber reinforcement material include, but are not limited to, fiberglass material, carbon fiber material, fiberglass, and/or aramid (e.g., Kevlar®) material. The fiber material may include one or more continuous lengths of fiber as discussed below in further detail. The present disclosure, however, is not limited to the foregoing exemplary materials. Each cascade 48, for example, may be formed from any material capable of being processed as described below.

Figure 10:
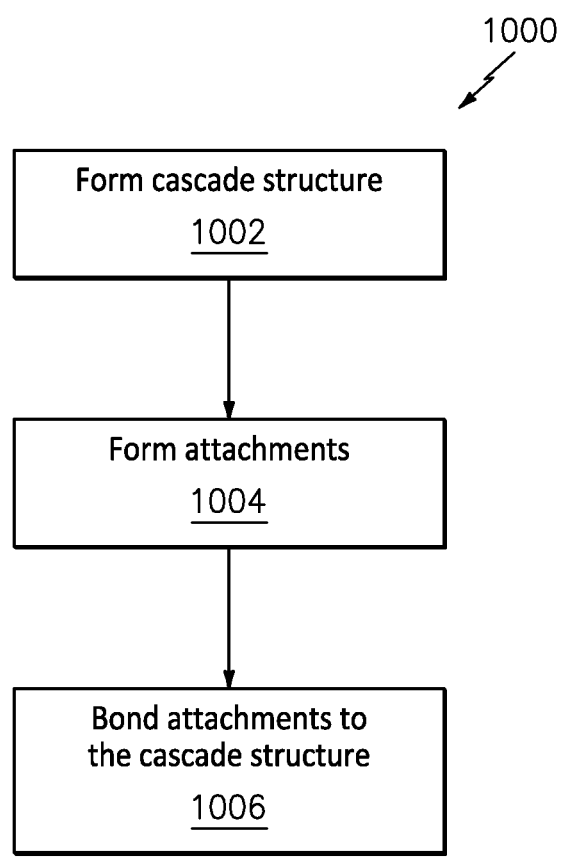
FIG. 10 is a block diagram of a process for forming a thrust reverser cascade.

FIG. 10 is a flow diagram of a process 1000 for forming a thrust reverser cascade. This process 1000 is described below with reference to forming the thrust reverser cascade 48 for ease of description. The process 1000 of FIG. 10, however, may alternatively be used to form thrust reverser cascades other than the one described above.

Figure 11:
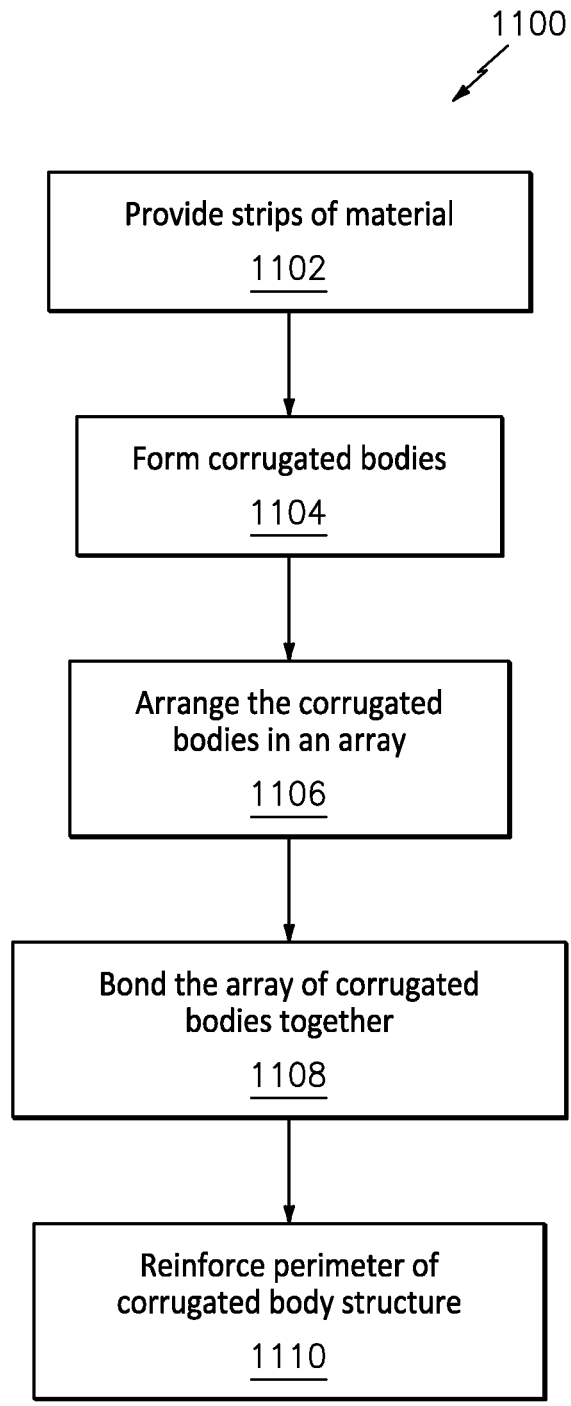
FIG. 11 is a block diagram of a process for forming a cascade structure.

In step 1002, the cascade structure 62 is formed. This cascade structure 62 may be formed using, for example, a sub-process 1100 as illustrated in FIG. 11.

Figure 12:
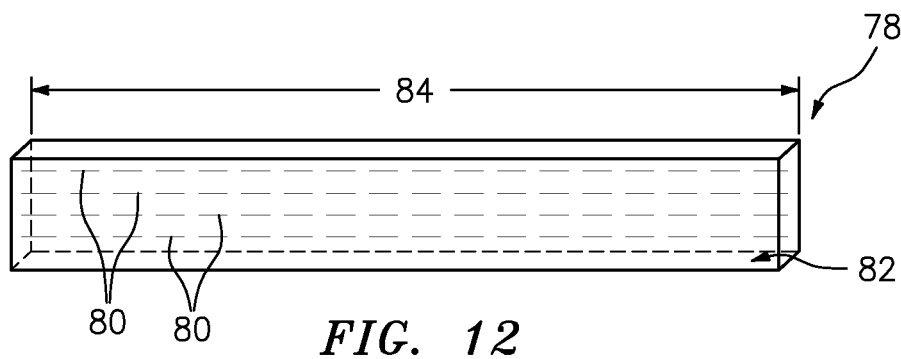
FIG. 12 is a perspective schematic illustration of a panel of material.

In step 1102, a plurality of panels (e.g., strips) of material 78 are provided, an exemplary one of which is illustrated in FIG. 12. Each of these panels of material 78 may be configured as a fiber-reinforced polymer (e.g., thermoplastic) panel of material. In some embodiments, each panel of material 78 may include one or more continuous (e.g., uninterrupted) lengths of fiber reinforcement that extend end-to-end through the respective panel of material 78. For example, the panel of material 78 of FIG. 12 is configured with one or more continuous fibers 80, where each continuous fiber 80 is embedded with within a polymer (e.g., thermoplastic) matrix 82 and extends at least substantially (e.g., at least 95%) or completely along an entire length 84 of the panel of material 78. Of course, in other embodiments, a single fiber 80 may extend back and forth one or more times at least substantially along the entire length 84 of the panel of material.

Figure 13:
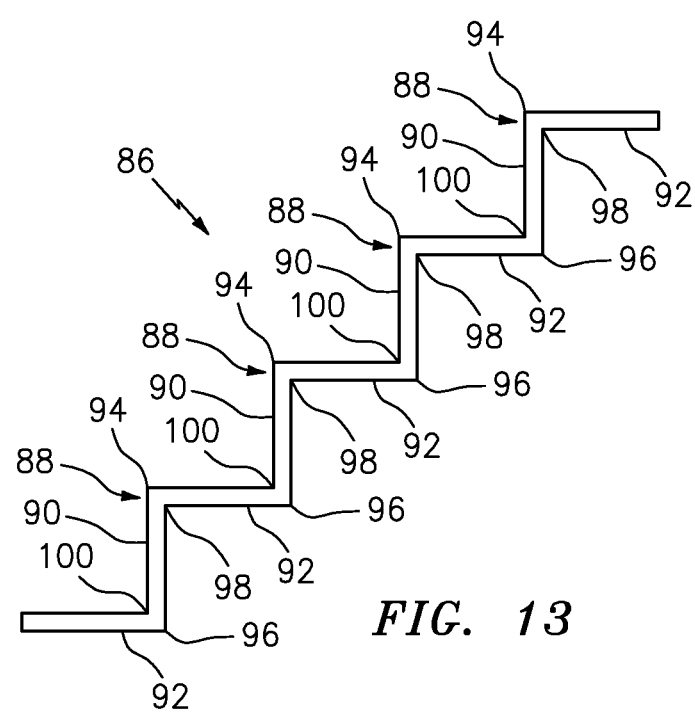
FIG. 13 is a schematic illustration of a corrugated body.

In step 1104, each of the panels of material 78 is formed into a corrugated body 86; e.g., see FIG. 13. For example, each panel of material 78 may be stamped into the corrugated body 86. The corrugated body 86 includes one or more corrugations 88 arranged end-to-end along a length thereof. Each corrugation 88 includes a first section 90 and a second section 92. A first end of the first section 90 meets and is connected to a first end of the second section 92 at an intra-corrugation peak 94 (e.g., a corner) of the corrugation 88. A second end of the first section 90 may meet and be connected to a second end of the second section 92 of an adjacent corrugation 88 at an inter-corrugation peak 96 (e.g., a corner) between the respective corrugations 88. Similarly, the second end of the second section 92 may meet and be connected to the second end of the first section 90 of another adjacent corrugation 88 at another inter-corrugation peak 96 between the respective corrugations 88. With such a configuration, the corrugated body 86 has a stepped (e.g., zig-zagged) configuration where each of the first sections 90 may form a riser section and each of the second sections 92 may form a run section, or vice versa depending upon the orientation of the corrugated body 86.

Figure 14:
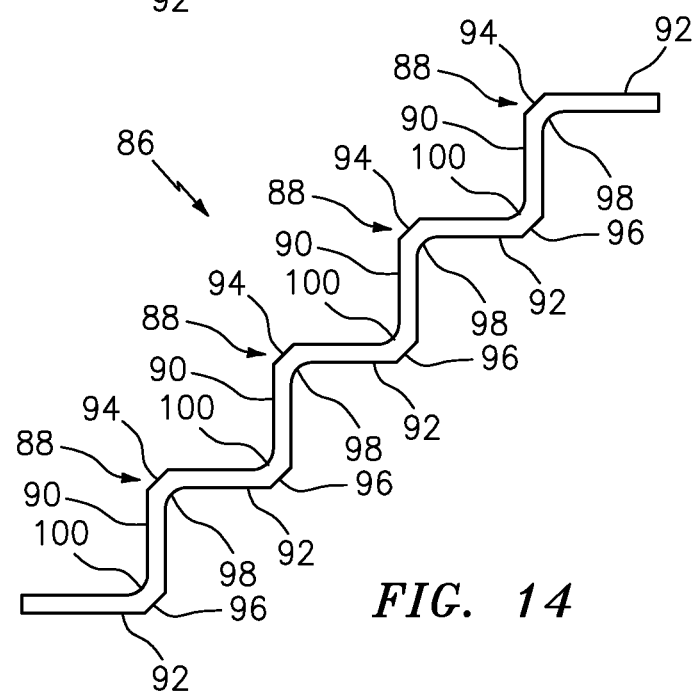
FIG. 14 is a schematic illustration of another corrugated body.

In some embodiments, each peak 94 and/or 96 of the corrugated body 86 may have a sharp edge as shown in FIG. 13. However, in other embodiments, at least one or each peak 94 and/or at least one or each peak 96 of the corrugated body 86 may have a chamfered edge as shown in FIG. 14.

Referring again to FIG. 13, opposite each intra-corrugation peak 94 is an intra-corrugation interior corner 98 and opposite each inter-corrugation peak 96 is an inter-corrugation interior corner 100. Each of these corners 98 and/or 100 of the corrugated body 86 may be configured as a sharp (e.g., a squared-off) corner as shown in FIG. 13. However, in other embodiments, at least one or each corner 98 and/or at least one or each corner 100 of the corrugated body 86 may be configured as a radiused (e.g., curved, arcuate) or filleted corner as shown in FIG. 14.

Figure 15:
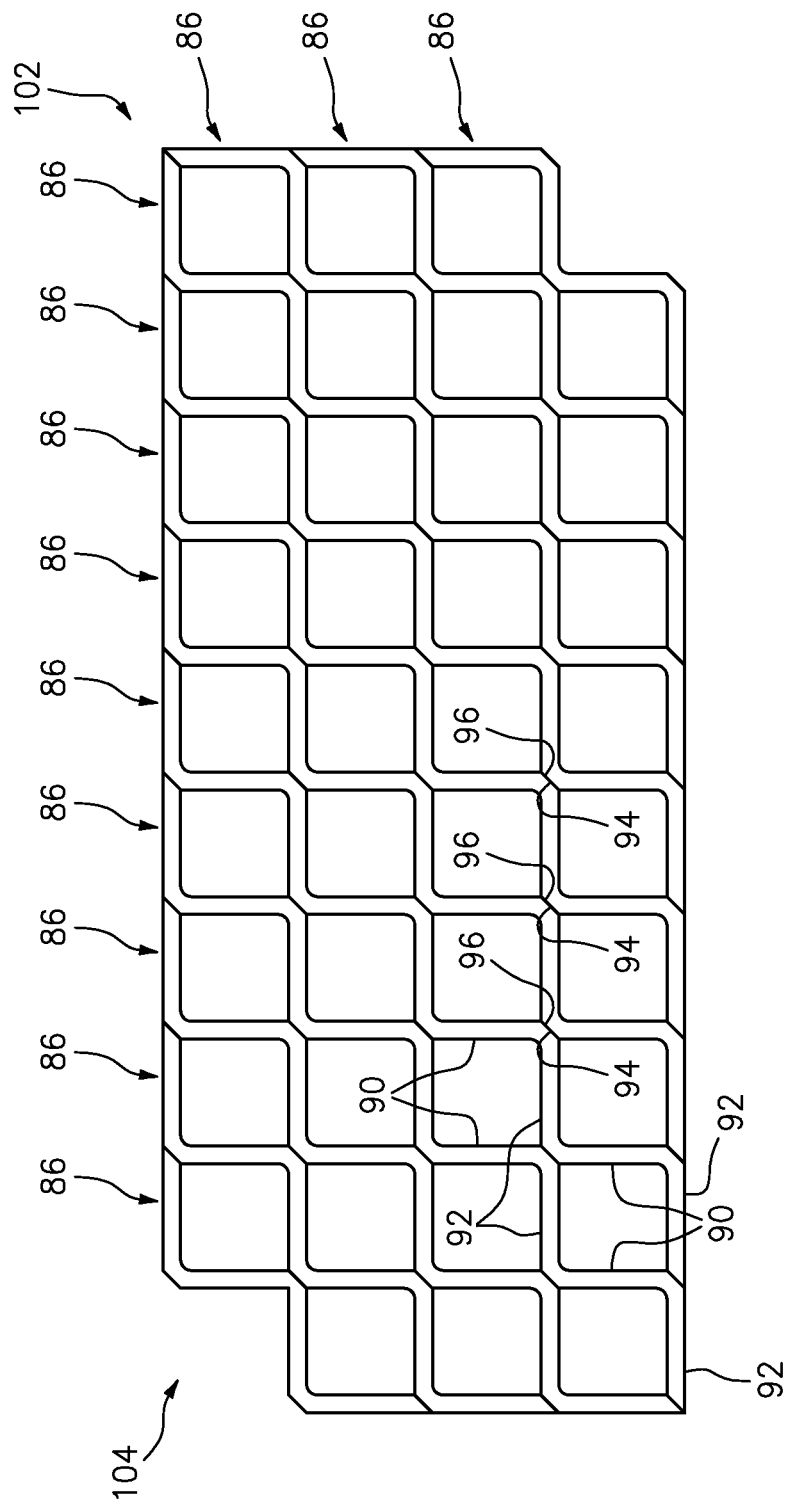
FIG. 15 is a schematic illustration of a corrugated body structure.
Figure 16:
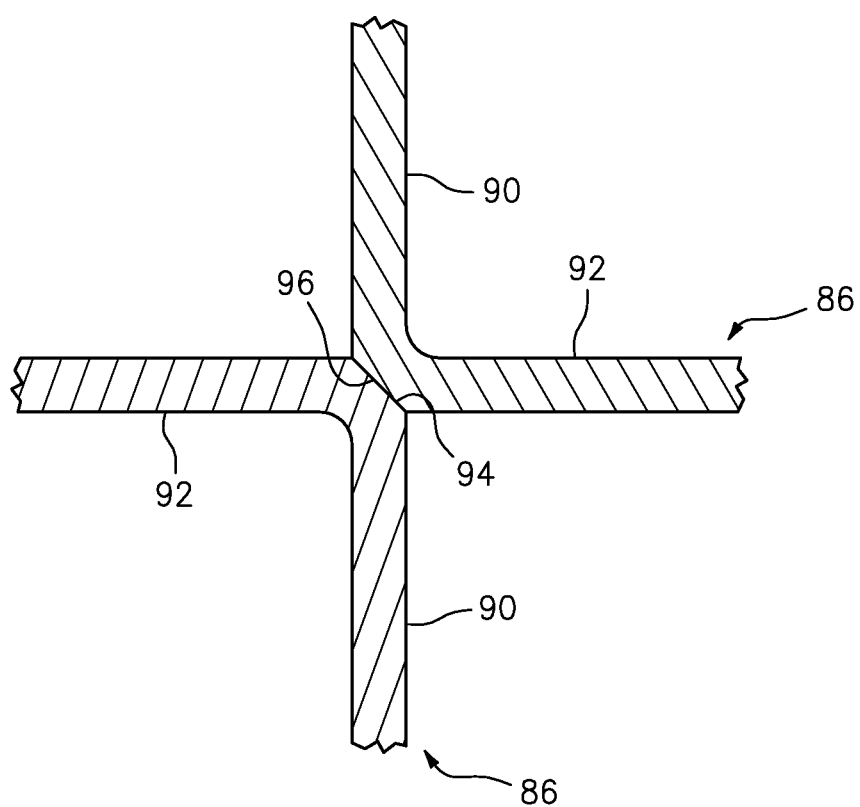
FIG. 16 is a sectional illustration of an exemplary bond joint for the corrugated body structure.

In step 1106, the corrugated bodies 86 are arranged side-by-side in an array 102 as shown, for example, in FIG. 15. In this array 102, each intra-corrugation peak 94 of each corrugated body 86 is aligned with and may engage (e.g., contact) a respective inter-corrugation peak 96 of an adjacent one of the corrugated bodies 86. In addition or alternatively, each inter-corrugation peak 96 of each corrugated body 86 is aligned with and may engage (e.g., contact) a respective intra-corrugation peak 94 of another adjacent one of the corrugated bodies 86. Note, the chamfered edges provide additional contact area between the aligned peaks 94 and 96 for subsequent bonding; e.g., see FIG. 16.

In step 1108, the array of the corrugated bodies 86 are bonded together. For example, the aligned peaks 94 and 96 between adjacent corrugated bodies 86 may be welded, adhered and/or otherwise bonded together to provide a corrugated body structure 104.

Figure 17:
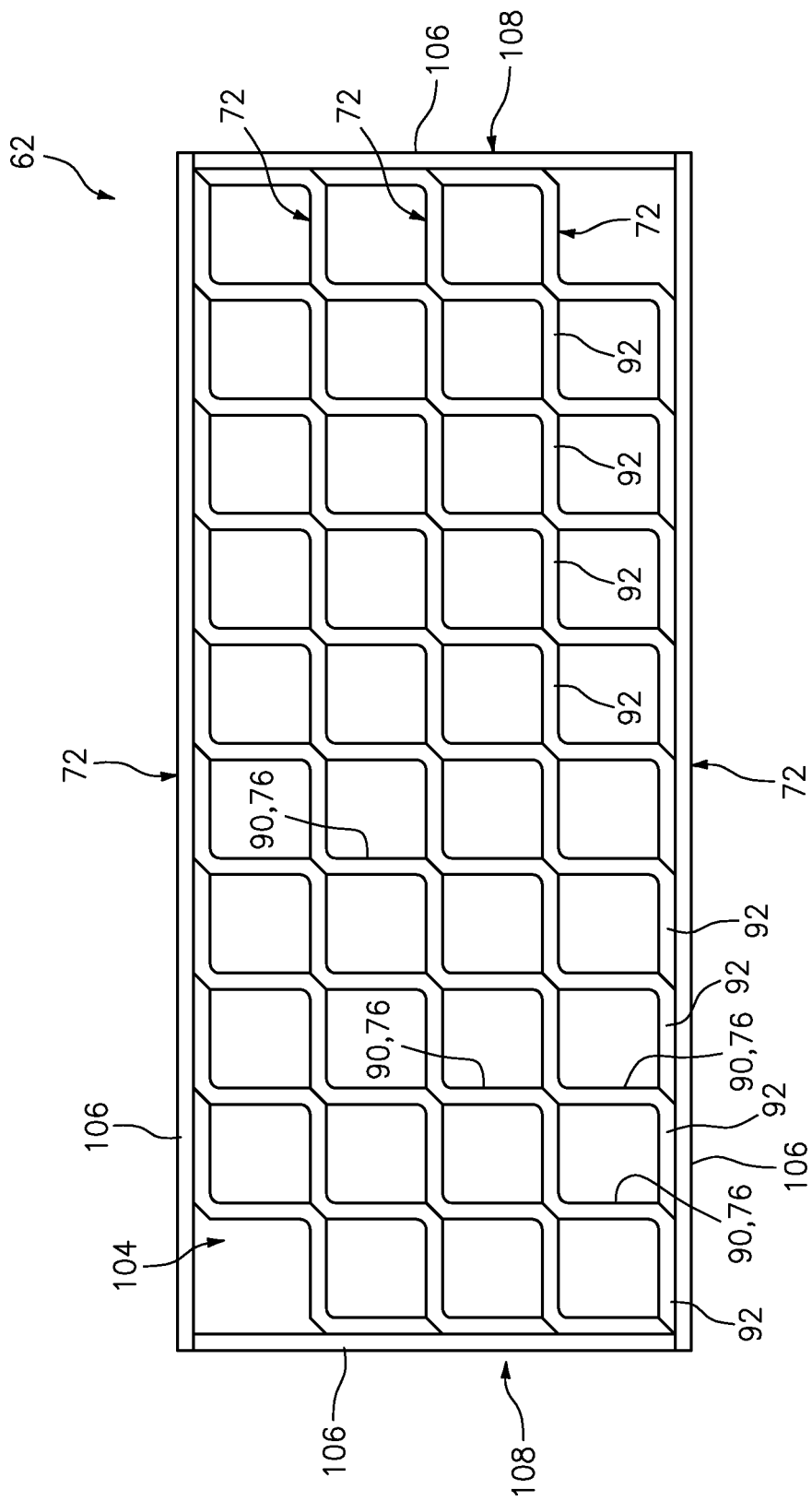
FIG. 17 is a schematic illustration of the cascade structure.

In step 1110, at least a portion (or an entirety) of a perimeter of the corrugated body structure 104 is reinforced. For example, at least one additional panel of material 106 (similar to or the same as the panels of material 78; see FIG. 12) is arranged along the perimeter of the corrugated body structure 104 as shown, for example, in FIG. 17. Each panel of material 106 may extend along an entire side as shown in FIG. 17. Alternatively, a respective panel of material 106 may extend partially along a respective side. Still alternatively, a respective panel of material 106 may extend along some or all of the sides of the corrugated body structure 104; e.g., wrap partially or completely around the structure 104. Each additional panel of material 106 is subsequently bonded to the corrugated body structure 104 to provide the cascade structure 62.

With the formation process 1100 of FIG. 11, each first section 90 of each corrugated body 86 may (e.g., completely) form a respective one of the vanes 76, or partially form a respective portion of a respective one of the endwalls 108. Each second section 92 of each corrugated body 86 may (e.g., completely) form a respective portion of a respective one of the interior strongback rails 72, or partially form a respective portion of a respective one of the exterior strongback rails 72. Each additional panel of material 106 may similarly at least partially form a perimeter wall section (e.g., an exterior sidewall) of the cascade structure 62 such as, for example, a respective exterior strongback rail 72 or a respective endwall 108. Thus, each vane 76 may be defined by a single first section 90 whereas each strongback rail 72 may be defined by at least a longitudinal array of end-to-end second sections 92.

Referring again to the process 1000 of FIG. 10, in step 1004, one or more of the attachments 64 and 66 are formed; e.g., see FIG. 5. One or more of the attachments 64 and 66 may be formed from a polymer such as thermoplastic material with or without fiber-reinforcement. The entire cascade 48 may thereby be formed of the same or similar material; e.g., fiber-reinforce polymer (e.g., thermoplastic) material.

In step 1006, the attachments 64 and 66 are bonded to the cascade structure 62 to thereby form the cascade 48; e.g., see FIG. 5. Each attachment 64, 66, for example, may be bonded to a respective end 50, 52 of the cascade structure 62 using any suitable bonding technique. Such bonding techniques include, but are not limited to, ultrasonic welding, resistance welding, adhesion, etc. Of course, in other embodiments, one or more of the attachments 64 and 66 may be formed along with the cascade structure 62 during the formation step such that the attachment(s) 64, 66 is/are formed integrally with the cascade structure 62.

Using the processes of FIGS. 10 and 11, the manufacture of the cascade 48 may be at least partially automated and reduce or eliminate requirements for hand layup techniques. For example, the panels of material may be cut to length and then stamped using automated equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A manufacturing process, comprising:
    forming a thrust reverser cascade for an aircraft propulsion system, the forming of the thrust reverser cascade comprising
    stamping a first panel of material into a first corrugated body, wherein the first corrugated body comprises a first corrugated body first section and a first corrugated body second section that meets and is connected to the first corrugated body first section at a first corner;
    stamping a second panel of material into a second corrugated body, wherein the second corrugated body comprises a second corrugated body first section and a second corrugated body second section that meets and is connected to the second corrugated body first section at a second corner; and
    bonding the first corrugated body to the second corrugated body, the bonding of the first corrugated body to the second corrugated body comprises bonding the first corner to the second corner;
    wherein the thrust reverser cascade includes a first rail, a second rail and a plurality of vanes connected to and extending between the first rail and the second rail;
    wherein the first corrugated body comprises a first corrugation;
    wherein a first section of the first corrugation forms a first of the plurality of vanes, and a second section of the first corrugation forms a first portion of the first rail;
    wherein the second corrugated body comprises a second corrugation; and
    wherein a first section of the second corrugation forms a second of the plurality of vanes that is spaced from the first of the plurality of vanes by an air channel, and a second section of the second corrugation forms a second portion of the first rail that is adjacent, connected to and parallel with the first portion of the first rail.

2. The manufacturing process of claim 1, wherein the first panel of material comprises polymer material.

3. The manufacturing process of claim 1, wherein the first panel of material is a fiber-reinforced thermoplastic panel of material.

4. The manufacturing process of claim 1, wherein the first corner is configured with a first chamfered edge.

5. The manufacturing process of claim 4, wherein
    the second corner is configured with a second chamfered edge; and
    the second chamfered edge is bonded to the first chamfered edge.

6. The manufacturing process of claim 1, wherein the first corrugated body includes a radiused interior corner positioned opposite the first corner.

7. The manufacturing process of claim 1, wherein
    the first corrugated body further comprises a second corrugation; and
    a section of the second corrugation forms a first portion of the second rail.

8. The manufacturing process of claim 1, wherein
    the forming of the thrust reverser cascade further comprises bonding a third panel of material to the first corrugated body and the second corrugated body; and
    the third panel of material at least partially forms an exterior sidewall of the thrust reverser cascade.

9. The manufacturing process of claim 1, wherein the first panel of material is configured with a continuous length of fiber reinforcement that extends end-to-end through the first panel of material.

10. A manufacturing process, comprising:
    forming a thrust reverser cascade for an aircraft propulsion system, the forming of the thrust reverser cascade comprising
    forming a first panel of material into a first corrugated body with a plurality of first corrugations, wherein each of the first corrugations comprises a first corrugation first section and a first corrugation second section that meets and is connected to the first corrugation first section at a first corner;
    forming a second panel of material into a second corrugated body with a plurality of second corrugations, wherein each of the second corrugations comprises a second corrugation first section and a second corrugation second section that meets and is connected to the second corrugation first section at a second corner; and
    bonding the first corner of each of the plurality of first corrugations to the second corner of a respective one of the plurality of second corrugations;
    wherein the thrust reverser cascade includes a first rail, a second rail and a plurality of vanes connected to and extending between the first rail and the second rail;
    wherein a first section of a first of the first corrugations forms a first of the plurality of vanes, and a second section of the first of the first corrugations forms a first portion of the first rail; and wherein a first section of a first of the second corrugations forms a second of the plurality of vanes that is spaced from the first of the plurality of vanes by an air channel, and a second section of the first of the second corrugations forms a second portion of the first rail that is adjacent, connected to and parallel with the first portion of the first rail.

11. The manufacturing process of claim 10, wherein the thrust reverser cascade comprises fiber reinforcement within a polymer matrix.

12. The manufacturing process of claim 10, wherein
the forming of the thrust reverser cascade further comprises bonding a flat panel of material to each of the first corrugated body and the second corrugated body; and the flat panel of material at least partially forms an exterior sidewall of the thrust reverser cascade.

13. The manufacturing process of claim 10, wherein the first panel of material is configured with a continuous length of fiber that extends at least substantially along an entire length of the first panel of material.

14. The manufacturing process of claim 10, wherein the first panel of material is a fiber-reinforced thermoplastic panel of material.

* * * * *